United States Patent
Lim et al.

(10) Patent No.: US 9,313,669 B2
(45) Date of Patent: Apr. 12, 2016

(54) APPARATUS AND METHOD FOR CALCULATING LOCATION OF MOBILE STATION IN WIRELESS NETWORK

(71) Applicant: LG ELECTRONICS INC., Seoul (KR)

(72) Inventors: Dongguk Lim, Anyang-si (KR); Dongcheol Kim, Anyang-si (KR); Jiwon Kang, Anyang-si (KR); Hangyu Cho, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 148 days.

(21) Appl. No.: 14/015,903

(22) Filed: Aug. 30, 2013

(65) Prior Publication Data

US 2014/0064126 A1 Mar. 6, 2014

Related U.S. Application Data (60) Provisional application No. 61/695,277, filed on Aug. 30, 2012.

(51) Int. Cl.
*H04W 24/00* (2009.01)
*G01S 5/02* (2010.01)
*H04W 64/00* (2009.01)

(52) U.S. Cl.
CPC ............. *H04W 24/00* (2013.01); *G01S 5/0252* (2013.01); *G01S 5/0257* (2013.01); *G01S 5/0263* (2013.01); *H04W 64/00* (2013.01); *H04W 64/003* (2013.01)

(58) Field of Classification Search
CPC .......... H04W 24/00; H04W 64/00; G01S 5/00
USPC .................. 370/252; 455/456.1, 456.2, 456.3, 455/456.4, 456.5, 456.6
See application file for complete search history.

(56) References Cited

U.S. PATENT DOCUMENTS

| | | | |
|---|---|---|---|
| 7,664,511 B2 * | 2/2010 | Wang et al. ................. | 455/456.1 |
| 8,971,922 B2 * | 3/2015 | Lim ....................... | H04W 4/023 455/12.1 |

(Continued)

*Primary Examiner* — Un C Cho
*Assistant Examiner* — Shah Rahman
(74) *Attorney, Agent, or Firm* — Lee, Hong, Degerman, Kang & Waimey (57) ABSTRACT

A method for measuring the indoor position of a UE by a network node according to an embodiment of the present invention may include: receiving, from the UE, measurement information including the intensity of a signal received from an access point (AP) and feedback information including information about a sensor configured to measure movement of the UE and sensor measurement information regarding movement of the UE, measured by the sensor; estimating the position of the UE based on the measurement information and received signal strength (RSS) from the AP, predetermined for each reference point; and calculating the indoor position of the UE by applying the information about the sensor and a sensor correction factor corresponding to the sensor measurement information to the estimated position of the UE.

4 Claims, 4 Drawing Sheets

(56) References Cited

U.S. PATENT DOCUMENTS

| | | | |
|---|---|---|---|
| 2002/0168989 A1* | 11/2002 | Dooley et al. | 455/456 |
| 2003/0125044 A1* | 7/2003 | Deloach et al. | 455/456 |
| 2003/0125046 A1* | 7/2003 | Riley et al. | 455/456 |
| 2005/0012660 A1* | 1/2005 | Nielsen et al. | 342/357.06 |
| 2006/0187028 A1* | 8/2006 | Kiang et al. | 340/539.13 |
| 2008/0032705 A1* | 2/2008 | Patel | H04W 4/18 455/456.1 |
| 2009/0043504 A1* | 2/2009 | Bandyopadhyay et al. | 701/213 |
| 2010/0265836 A1* | 10/2010 | Lau et al. | 370/252 |
| 2012/0054054 A1* | 3/2012 | Kameyama | G01C 21/3608 705/26.1 |
| 2012/0150440 A1* | 6/2012 | Sambongi | G01C 21/08 701/472 |
| 2013/0247117 A1* | 9/2013 | Yamada | G08C 17/02 725/93 |

* cited by examiner

APPARATUS AND METHOD FOR CALCULATING LOCATION OF MOBILE STATION IN WIRELESS NETWORK

CROSS REFERENCE TO RELATED APPLICATIONS

Pursuant to 35 U.S.C. §119(e), this application claims the benefit of U.S. Provisional Application No. 61/695,277, filed on Aug. 30, 2012, the contents of which are incorporated by reference herein in their entirety.

BACKGROUND OF THE INVENTION

1. Field of the Invention

The present invention relates to positioning, and more particularly, to a method and apparatus for measuring the position of a terminal located indoors using a wireless network.

2. Discussion of the Related Art

An assisted global positioning system (A-GPS) is a satellite-based positioning system that can under certain conditions (mostly, when a data link with a server is established) improve a GPS startup speed and reduce time to first fix (TTTF) (which is a time taken to fix a data link with an artificial satellite). An A-GPS is mainly used in a user equipment (UE) (e.g., a cellular phone or a smart phone) having a built-in GPS and was developed by Federal Communications Commission in order to transmit location information during 911 emergency calls.

A UE can support location information to a user via A-GPS technologies. A-GPS technologies are location information service technologies that are mainly used in 3rd generation partnership project (3GPP) standard and currently provide many services to subscribers. In simpler terms, the UE receives GPS (which corresponds to A-GNSS in terms of 3GPP) satellite information and transmits or receives location related information of a base station (BS) based on the GPS satellite information to receive accurate location information through a server that manages location information of the BS.

A-GPS technologies have been already used to provide more accurate location information using information received by a UE from a GPS via communication with a server that manages location information of a BS. Recently, A-GPS technologies have been mainly used in fields of wideband code division multiple access (WCDMA) of 3GPP standard or code division multiple access (CDMA) of 3GPP2 standard. In areas where UEs cannot easily receive location information, locations are estimated using satellite information alone, which is disadvantageously less accurate than A-GPS technologies. In addition, time required to acquire location information may be changed according to an area.

From the Cold War with the Soviet Union, the United States launched many artificial satellites out of the earth in order to spy upon the Soviet Union. These satellites periodically transmit location information to the earth at a specific frequency. When a UE receives location information to estimate a location, errors corresponding to several hundred meters may be experienced. Accordingly, for more accurate estimation and error reduction, a UE accesses a location information server of a BS using information received from a GPS to obtain a more accurate location, which is called A-GPS technologies. In general, an error range is reduced within several meters even if accuracy is changed according to a location of a UE within an area managed by a BS.

However, according to these technologies, problems arise in terms of location acquisition when a UE fails to receive GPS signals. Of course, when the UE is located in a building, the UE can receive GPS signals through antennas installed outdoors. However, currently, this reception is significantly limited, and thus, many problems arise in areas where GPS signals cannot be received, such as indoors or underground. In this case, it is very difficult to acquire accurate location information by the UE in reality.

Accordingly, a method for estimating the location of a UE disposed indoors is needed. Particularly, it is necessary to provide methods for correctly estimating the location of a UE disposed indoors without error.

SUMMARY OF THE INVENTION

An object of the present invention is to provide a method for calculating the location of a UE disposed indoors.

Another object of the present invention is to provide an apparatus for calculating the location of a UE disposed indoors.

The technical problems to be solved by the present invention are not limited to the above technical problems and those skilled in the art may understand other technical problems from the following description.

The object of the present invention can be achieved by providing a method for measuring a position of a user equipment (UE) located in an indoor by a network node, including: receiving, from the UE, measurement information including the intensity of a signal received from an access point (AP) and feedback information including information about a sensor configured to measure movement of the UE and sensor measurement information regarding movement of the UE, measured by the sensor; estimating the position of the UE based on the measurement information and information on a predetermined reference point corresponding to the intensity of the signal; and calculating an indoor position of the UE by applying the information about the sensor and a sensor correction factor corresponding to the sensor measurement information to the estimated position of the UE. The sensor correction factor may include at least one of a sensor measurement value resetting factor, a sensor measurement value weighting factor and a sensor measurement period ensuring reliability of the sensor. The feedback information may further include information on the type of the UE, and the position of the UE may be calculated using a sensor correction factor corresponding to the UE type in consideration of the UE type. The network node may correspond to the AP, a location server, a gateway or a router. The method may further include transmitting sensor correction information including the sensor correction factor to the UE.

In another aspect of the present invention, provided herein is a method for calculating a position of a user equipment (UE) located in an indoor, including: receiving sensor correction information about a sensor configured to measure movement of the UE; and calculating an indoor position of the UE by applying the sensor correction information to an estimated position of the UE. The sensor correction information may include at least one of a sensor measurement value resetting factor, a sensor measurement value weighting factor and a sensor measurement period ensuring reliability of the sensor. The position of the UE may be calculated using the sensor measurement value resetting factor when the sensor performs measurement for a period longer than the sensor measurement period ensuring reliability of the sensor. The indoor position of the UE may be calculated using a value measured by the sensor or by applying a weight to the value measured by the sensor when the sensor performs measurement for a period shorter than the sensor measurement period ensuring reliability of the sensor.

In another aspect of the present invention, provided herein is a network node apparatus for calculating a position of a user equipment (UE) located in an indoor, including: a mobile communication module configured to receive, from the UE, measurement information including the intensity of a signal received from an AP and feedback information including information about a sensor configured to measure movement of the UE and sensor measurement information regarding movement of the UE, measured by the sensor; and a location information module configured to estimate the position of the UE based on the measurement information and information on a predetermined reference point corresponding to the intensity of the signal, and to calculate the indoor position of the UE by applying the information about the sensor and a sensor correction factor corresponding to the sensor measurement information to the estimated position of the UE. The feedback information may further include information on the type of the UE, and the location information module may be configured to calculate an indoor position of the UE using a sensor correction factor corresponding to the UE type in consideration of the UE type. The network node apparatus may correspond to the AP, a location server, a gateway or a router.

In another aspect of the present invention, provided herein is an apparatus for calculating a position of a user equipment (UE), including: a mobile communication module configured to receive sensor correction information about a sensor measuring movement of the UE; and a location information module configured to calculate an indoor position of the UE by applying the sensor correction information to an estimated position of the UE. The sensor correction information may include at least one of a sensor measurement value resetting factor, a sensor measurement value weighting factor and a sensor measurement period ensuring reliability of the sensor. The location information module may be configured to calculate the indoor position of the UE using the sensor measurement value resetting factor when the sensor included in the location information module performs measurement for a period longer than the sensor measurement period ensuring reliability of the sensor. The location information module may be configured to calculate the indoor position of the UE using a value measured by the sensor or by applying a weight to the value measured by the sensor when the sensor included in the location information module performs measurement for a period shorter than the sensor measurement period ensuring reliability of the sensor.

In the location calculation methods according to embodiments of the present invention, it is possible to correctly estimate and calculate the location of a UE disposed indoors since an error caused by an inertial sensor can be corrected during HPS.

The effects of the present invention are not limited to the above-described effects and other effects which are not described herein will become apparent to those skilled in the art from the following description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A can be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an eNode B, a base station, AP (Access Point), etc. Throughout this specification, the technical features of the present invention are described based on an institute of electrical and electronic engineers (IEEE) 802.16 system, but can be applied to various other communication systems.

In a mobile communication system, a UE may receive information from a BS in downlink and transmit information in uplink. The information transmitted or received by the UE may be data and various control information. In addition, there are various physical channels according to the type or use of the information transmitted or received by the UE.

The following technical features can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communication (GSM)/general packet radio service (GPRS)/enhanced data rates for GSM evolution (EDGE), etc. OFDMA may be embodied through radio technology such as IEEE 802.11 (Wi-Fi), IEEE 802.16

(WiMAX), IEEE 802-20, evolved UTRA (E-UTRA), and the like. UTRA is a part of a universal mobile telecommunications system (UMTS). 3GPP LTE is a part of evolved UMTS (E-UMTS), which uses E-UTRA. The 3GPP LTE employs OFDMA in downlink and employs SC-FDMA in uplink. LTE advanced (LTE-A) is an evolved version of 3GPP LTE.

Specific terms used in the embodiments of the present invention are provided to aid in the understanding of the present invention. These specific terms may be replaced with other terms within the scope and spirit of the present invention.

Figure 1:
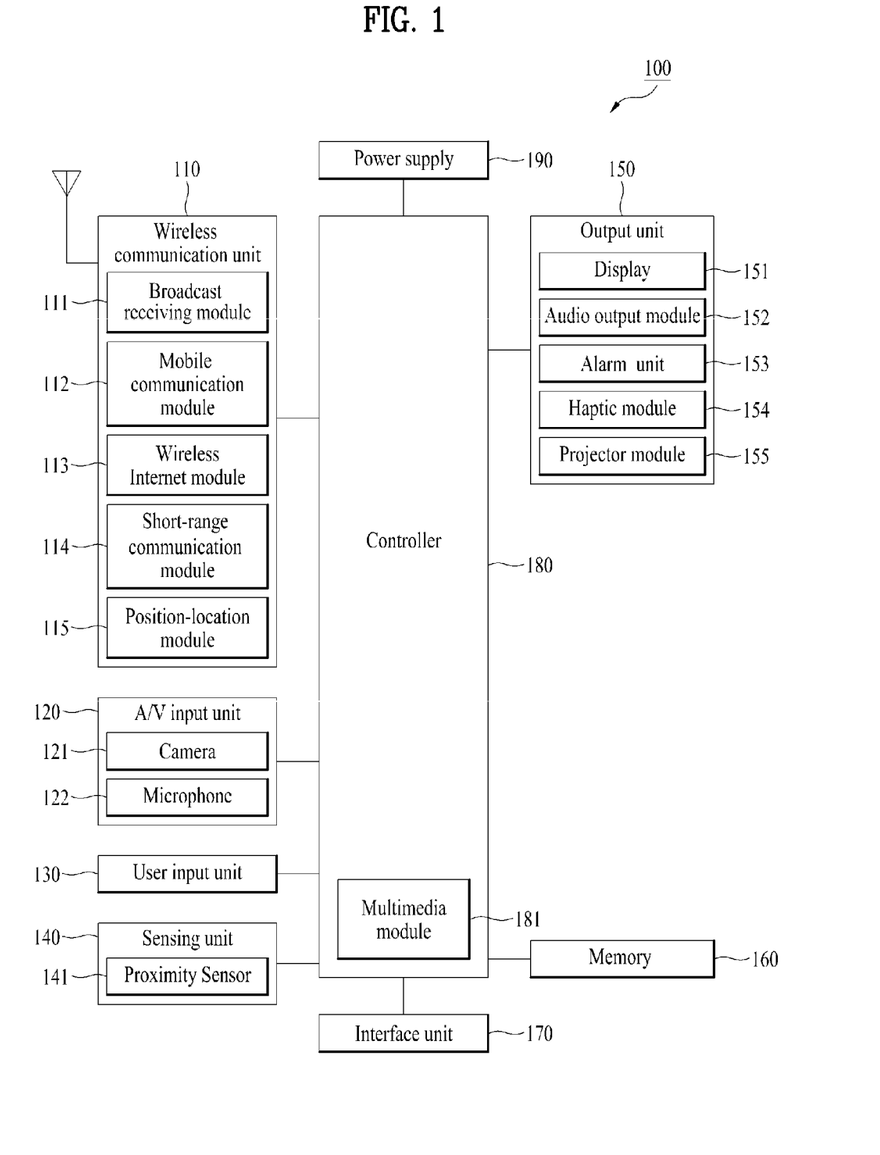
FIG. 1 is a schematic block diagram showing the configuration of a user equipment (UE) according to the present invention.

FIG. 1 is a schematic block diagram of a structure of a UE 100 according to the present invention.

Throughout this specification, a UE is not limited to a cellular phone as a telephone illustrated in the FIG. 1 and can be broadly applied to a smart phone, a notebook computer, a digital broadcast terminal, a personal digital assistant (PDA), a portable multimedia player (PMP) a navigation device, and the like. Thus, it can be understood that the UE includes any portable electronic product. The UE 100 may include a wireless communication unit 110, an audio/video (AN) input unit 120, a user input unit 130, a sensing unit 140, an output unit 150, a memory 160, an interface unit 170, a controller 180, a power supply unit 190, etc. When these components are embodied in actual applications, two or more components are combined to constitute one component or one component is divided into two or more components, as necessary.

Hereinafter, these components will be sequentially described.

The UE 100 may include the wireless communication unit 110, the AN input unit 120, the user input unit 130, the sensing unit 140, the output unit 150, the memory 160, the interface unit 170, the controller 180, the power supply unit 190, etc. The components illustrated in FIG. 1 are not required. Thus, greater or fewer components than in FIG. 1 may constitute the UE 100.

Hereinafter, these components will be sequentially described.

The wireless communication unit 110 may include one or more modules that can allow wireless communication between the UE 100 and a wireless communication system or between the UE 100 and a network in which the UE 100 is located. For example, the wireless communication unit 110 may include a broadcast receiving module 111, a mobile communication module 112, a wireless Internet module 113, a short range communication module 114, a location information module 115, etc.

The broadcast receiving module 111 receives a broadcast signal and/or broadcast related information from an external broadcast management server through a broadcast channel. The broadcast channel may include a satellite channel and a terrestrial channel. The broadcast management server may refer to a server that generates and transmits a broadcast signal and/or broadcast related information or a server that receives a pre-generated broadcast signal and/or broadcast related information and transmits the pre-generated broadcast signal and/or broadcast related information to a UE. The broadcast signal may include a broadcast signal formed by adding a data broadcast signal to a television (TV) broadcast signal or a radio broadcast signal as well as a TV broadcast signal, a radio broadcast signal, and a data broadcast signal.

The broadcast related information may refer to information regarding a broadcast channel, a broadcast program, or a broadcast service provider. The broadcast related information may be provided through a mobile communication network. In this case, the broadcast related information may be received by the mobile communication module 112.

A variety of types of broadcast related information may be present. For example, the broadcast related information may be present in the form of electronic program guide (EPG) of digital multimedia broadcasting (DMB), electronic service guide (ESG) of digital video broadcast-handheld (DVB-H), or the like.

The broadcast receiving module 111 may receive a digital broadcast signal using a digital broadcast system, for example, digital multimedia broadcasting-terrestrial (DMB-T), digital multimedia broadcasting-satellite (DMB-S), media forward link only (MediaFLO), digital video broadcast-handheld (DVB-H), DVB-CBMS, OMA-BCAST, integrated services digital broadcast-terrestrial (ISDB-T), etc. Of course, the broadcast receiving module 111 may be adapted to other broadcast systems as well as the aforementioned digital broadcast system.

The broadcast signal and/or broadcast related information received by the broadcast receiving module 111 may be stored in the memory 160.

The mobile communication module 112 transmits and receives a wireless signal to and from at least one of a BS, an external UE, and a server on a mobile communication network. The wireless signal may include a voice call signal, a video telephony call signal, and/or data in various forms according to transmission and reception of text/multimedia messages. The wireless Internet module 113 may refer to a module for wireless Internet access and may be installed internally or externally on the UE 100. As a wireless Internet technology, wireless LAN (WLAN) (Wi-Fi), wireless broadband (Wibro), world interoperability for microwave access (Wimax), high speed downlink packet access (HSDPA), etc. may be used.

The short range communication module 114 refers to a module for short range communication. As short range communication technologies, Bluetooth, radio frequency identification (RFID), infrared data association (IrDA), ultra wideband (UWB), ZigBee, etc. may be used.

The location information module 115 is a module for acquisition of location information of a UE. A representative example of the location information module 115 may include a global positioning system (GPS) module and an inertial sensor. According to current technologies, the GPS module may calculate information regarding distances from three or more modules and accurate time information and apply trigonometry to the calculated information to accurately calculate current location information according to latitude, longitude, and altitude. Currently, a method of calculating location and time information using three satellites and calibrating errors of the calculated position and time information using another satellite has been extensively used. In addition, the GPS module may continuously calculate a current location in real time to calculate velocity information. The inertial sensor calculates a relative location value by measuring a movement distance at a reference point using an accelerometer and by measuring a movement direction using a gyroscope. The inertial sensor will be described in more detail.

Referring to FIG. 1, the A/V input unit 120 is used to input an audio signal or a video signal and may include a camera 121 and a microphone 122. The camera 121 processes image frames of still images or moving pictures obtained by an image sensor in a video telephony mode or a photograph mode. The processed image frames may be displayed by a display unit 151. The image frames processed by the camera 121 may be stored in the memory 160 or externally transmitted through the wireless communication unit 110. The UE 100 may include two or more cameras 122 according to service environment.

The microphone 122 receives an external audio signal in a call mode, a recording mode, a voice recognition mode, or the like and processes the received audio signal into electrical voice data. In the call mode, the processed voice data is converted into a form in which the data can be transmitted to a mobile communication BS through the mobile communication module 112 and output. The microphone 122 may employ various noise removal algorithms for removal of noise generated when the external audio signal is received.

The user input unit 130 generates input data for control of an operation of the UE 100 from a user. The user input unit 130 may receive a signal indicating two or more content items among displayed content items, according to the present invention. In addition, the signal indicating the two or more content items may be received through touch input or hard and soft key input. The user input unit 130 may receive input for selection of one or two or more content items from the user. In addition, the user input unit 130 may receive input for generation of an icon related to a function performed by the UE 100. The user input unit 130 may include a direction key, a key pad, a dome switch, a touch pad (constant voltage/capacitance), a jog wheel, a jog switch, and so on.

The sensing unit 140 may sense a current state of the UE 100 such as an open/close state of the UE 100, a location of the UE 100, whether a user touches the UE 100, a direction of the UE 100, and acceleration/deceleration of the UE 100 to generate a sensing signal for control of the operation of the UE 100. For example, when the UE 100 is a slide phone, the sensing unit 140 may sense whether the slide phone is opened or closed. In addition, the sensing unit 140 may sense whether the power supply unit 190 supplies power and whether the interface unit 170 is connected to an external device. The sensing unit 140 may include a proximity sensor 141. The proximity sensor 141 will be described below with regard to a touchscreen.

The output unit 150 may generate visual, auditory, or tactile output and may include the display unit 151, an audio output module 152, an alarm unit 153, a haptic module 154, and a projector module 155. The display unit 151 may display (output) information processed by the UE 100. For example, when the UE 100 is in a call mode, the display unit 151 displays a user interface (UI) or a graphical user interface (GUI) related to a telephone call. When the UE 100 is in a video telephony mode or a photograph mode, the display unit 151 displays a captured and/or received image, a UI, or a GUI. The display unit 151 may include at least one of a liquid crystal display (LCD), a thin film transistor-liquid crystal display (TFT LCD), an organic light-emitting diode (OLED), a flexible display, and a three-dimensional (3D) display. Among these, some displays may be a transparent type or a light transmission type display such that a user can view an object behind the display therethrough. In this case, these displays may be called a transparent display. A representative example of the transparent display may include a transparent OLED (TOLED) and the like. The display unit 151 may be configured to have a rear structure or a light transmission structure. Due to these structures, the user can view an object located behind a body of the UE 100 through a transparent area of the body of the UE 100, which is occupied by the display unit 151. The UE 100 may include two or more display units 151 according to an embodiment type of the UE 100. For example, the UE 100 may include a plurality of display units that are arranged or integrated on one surface at a predetermined distance or arranged on different surfaces. When the display unit 151 and a sensor (hereinafter, referred to as a 'touch sensor') for detection of a touch operation form a layered structure (hereinafter, referred to as a 'touch-screen'), the display unit 151 may be used as an input device as well as an output device. For example, the touch sensor may be in the form of a touch film, a touch sheet, a touch pad, and so on.

The touch sensor may convert variation in pressure applied to a specific portion of the display unit 151 or variation in capacitance generated at a specific portion of the display unit 151 into an electrical input signal. The touch sensor may sense pressure of touch as well as a location and area of the touch. When touch input to the touch sensor is present, a signal (signals) corresponding to the touch input is transmitted to a touch controller (not shown). The touch controller processes the signal (signals) and then transmits data corresponding to the processed signal to the controller 180. Thus, the controller 180 may recognize a touched portion of the display unit 151.

The proximity sensor 141 may be disposed in an internal region of the UE 100, surrounded by the touchscreen, or near the touchscreen. The proximity sensor 141 refers to a sensor that senses an object approaching a predetermined sensing surface or an object located near the proximity sensor 141 using an electromagnetic force or infrared rays without having mechanical contact. The proximity sensor 141 may have a longer lifetime than a contact sensor, thus having a wider range of applications. An example of the proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, an infrared proximity sensor, etc. When the touchscreen is of a capacitance type, the proximity sensor 141 may be configured to detect proximity of a pointer through variation in an electric field according to proximity of the pointer. In this case, the touchscreen (or a touch sensor) may be classified as a proximity sensor. Hereinafter, for convenience of description, an action of allowing recognition of presence of the pointer on the touchscreen via the pointer approaching the touchscreen without actually touching the touchscreen will be referred to a "proximity touch" and an action of actually bringing the pointer into contact with the touchscreen will be referred to a "contact touch". In this case, a point at which the proximity touch occurs corresponds to a point of the touchscreen, in which the point is imaginarily projected during the proximity touch. The proximity sensor 141 senses the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touchscreen.

The audio output module 152 may output audio data received from the wireless communication unit 110 or stored in the memory 160 in a call signal receiving mode, a telephone call mode, a recording mode, a voice recognition mode, or a broadcasting receiving mode. The audio output module 152 may output audio signals related to functions (e.g., a ringtone, a message tone, etc.) performed by the UE 100. The audio output module 152 may include a receiver, a speaker, a buzzer, etc.

The alarm unit 153 outputs a signal indicating generation of an event of the UE 100. For example, alarms may be generated upon receiving a call signal, receiving a message, inputting a key signal, inputting touch, etc. The alarm unit 153 may also output signals in forms different from video signals or audio signals, for example, a signal for indicating generation of an event may be generated through vibration. The video signals or the audio signals may also be output through the display unit 151 or the audio output module 152. Thus, the display unit 151 and the audio output module 152 may be classified as a type of the alarm unit 153.

The haptic module 154 generates various haptic effects that the user can feel. A representative example of the haptic effect generated by the haptic module 154 is vibration. An intensity and pattern of vibration generated by the haptic module 154 may also be controlled. For example, different vibrations may be combined and output or can be sequentially output.

The haptic module 154 may generate a variety of haptic effects including an effect of stimulus according to arrangement of pins vertically moving against a contact skin surface, an effect of stimulus according to a jet force or suction force of air through a jet hole or a sucking suction hole, an effect of stimulus of rubbing the skin, an effect of stimulus according to contact of an electrode, an effect of stimulus using an electrostatic force, and an effect according to a reproduction of cold and warmth using an element that can absorb or radiate heat as well as vibrations. The haptic module 154 may not only transmit haptic effects through direct contact but may also allow the user to feel haptic effects through a kinesthetic sense of the user's fingers or arms. The UE 100 may include two or more haptic modules 154 according to an embodiment type of the UE 100. The projector module 155 performs a function of projecting an image using the UE 100 and may display an image, which is the same as or partially different from an image displayed on the display unit 151, on an external screen or a wall according to a control signal of the controller 180.

In detail, the projector module 155 may include a light source (not shown) for generating light (e.g., a laser beam) for externally outputting an image, an image generator (not shown) for generating an image to be externally output using the light generated by the light source, and a lens (not shown) for enlarging and externally outputting an image from a predetermined focal distance. In addition, the projector module 155 may include a device (not shown) for mechanically moving the lens or the projection module 155 to adjust an image projection direction. The projector module 155 may be classified into a cathode ray tube (CRT) module, a liquid crystal display (LCD) module, a digital light processing (DLP) module, and so on according to a display device type. In particular, the DLP module uses a method of enlarging and projecting an image generated by reflecting the light generated by the light source by a digital micromirror device (DMD) chip, and may be advantageous in terms of miniaturization of the projector module 155. Preferably, the projector module 155 may be installed on a lateral surface, a front surface, or a rear surface of the UE 100 in a longitudinal direction thereof. Of course, the projector module 155 may be installed at any location of the UE 100 as necessary.

The memory 160 may store a program for processes and control of the controller 180 and may temporally store input/output data (e.g., phone book, messages, audio, still images, moving pictures, etc.). The memory 160 may also store frequency of use of each data (e.g., frequency of use of each telephone number, each message, and each multimedia). In addition, the memory 160 may store data about vibration and sounds in various patterns that are output when touch input is applied to the touchscreen.

The memory 160 may include at least one of storage media such as a flash memory, a hard disk type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), magnetic memory, a magnetic disk, and an optical disk. The UE 100 may also operate in relation to a web storage that performs a storing function of the memory 160 on the Internet.

The interface unit 170 may serve as a path to external devices connected to the UE 100. The interface unit 170 may receive data from the external devices or power and transmit the data or power to internal components of the UE 100 or transmit data of the UE 100 to the external devices. For example, the interface unit 170 may include a wired/wireless headset port, an external charger port, a wired/wireless data port, a memory card port, a port for connecting a device having an identification module, an audio I/O port, a video I/O port, an earphone port, etc., for example.

The identification module is a chip that stores various information for authentication of an authority of the UE 100 and may include a user identify module (UIM), a subscriber identify module (SIM), a universal subscriber identity module (USIM), etc. A device (hereinafter, referred to as an 'identification device') including the identification module may be manufactured in the form of a smart card. Thus, the identification module may be connected to the UE 100 through a port. The interface unit 170 may also be a path through which power from an external cradle is supplied to the UE 100 when the UE 100 is connected to the external cradle or a path through which various command signals input by the user through the cradle are transmitted to the UE 100. The various command signals or power input from the cradle may be used as signals for confirming whether the UE 100 is accurately set in the cradle. The controller 180 may control overall operations of the UE 100. For example, the controller 180 may perform control and processing for voice communication, data communication, video telephony, etc. The controller 180 may include a multimedia module 181 for reproduction of multimedia. The multimedia module 181 may be internally embodied in the controller 180 or separately embodied from the controller 180.

The controller 180 may perform a pattern recognition process via which handwriting input or picture-drawing input applied to the touch screen is recognized as characters or images.

The power supply unit 190 may receive external power and internal power and supply power required for operations of the components according to control of the controller 180.

Although FIG. 1 is a block diagram showing the configuration of the UE according to the present invention, the configuration of the UE is equally applicable to a base station (BS), an access point (AP) and a location server.

Prior to the description of embodiments of the present invention, several positioning methods will be described. First, triangulation and WiFi Positioning System (WPS) (fingerprinting) are described as positioning methods.

Figure 2:
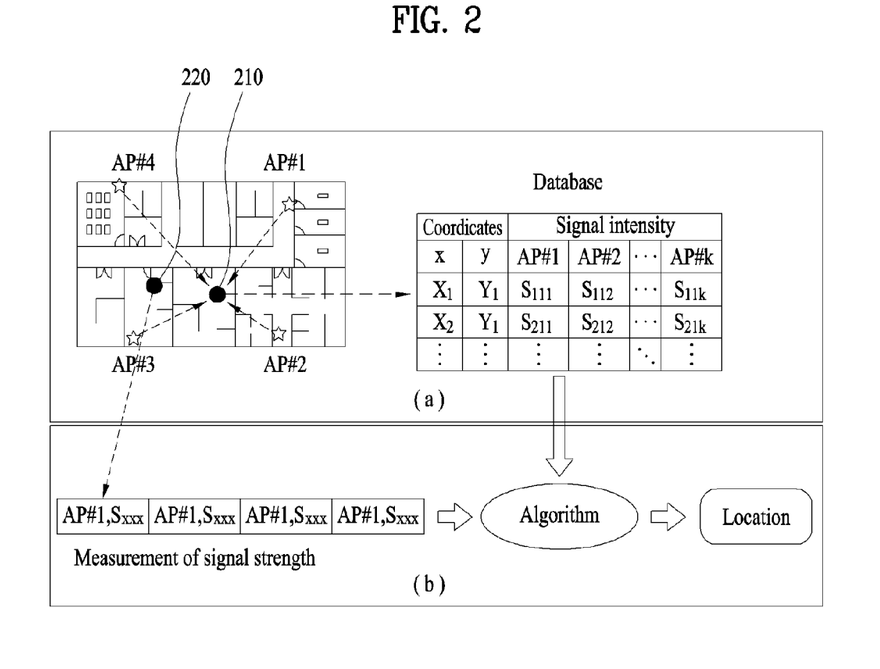
FIG. 2 is a diagram illustrating a fingerprinting positioning method in a Wi-Fi positioning system.

FIG. 2 is a diagram illustrating a fingerprinting positioning method in a Wi-Fi positioning system.

Fingerprinting is a method based on empirical data, in which an area to be positioned is divided into regions in a cell form or various forms, values of signals transmitted from an access point (AP) are measured at each reference point of the regions, and the values are stored in the form of a database. After the database of received signals is established, a signal value measured through actual positioning and a value stored in the database are compared to determine a location.

That is, fingerprinting may broadly include two steps. In the first step, an area which is subjected to location estimation is divided into regions in a specific form, intensity of a signal of the AP at each reference point of the regions is measured, and data is collected based on the signal intensity. In the second step, an actual location is estimated using a specific algorithm based on data stored in the form of database and actually measured signal values transmitted from the AP.

FIG. 2(a) is a diagram illustrating a signal collection step for positioning and shows a procedure through which a UE measures values of signals received from a plurality of APs AP1, AP2, AP3 and AP4 at a specific reference point 210 and stores the measured signal values in a database. FIG. 2(b) illustrates a procedure of applying the intensities of signals from the APs at a measurement point 220 and corresponding signal intensities stored in the database to an algorithm to perform positioning. A Wi-Fi positioning system using fingerprinting does not perform time synchronization for positioning and can enable correct indoor positioning because multipath components according to environments are included in the database. However, the fingerprinting positioning method needs to construct a database for a coverage area and to update the database when an environment is changed (an AP moves). As another example of the positioning method, an inertial positioning method will be described.

Figure 3:
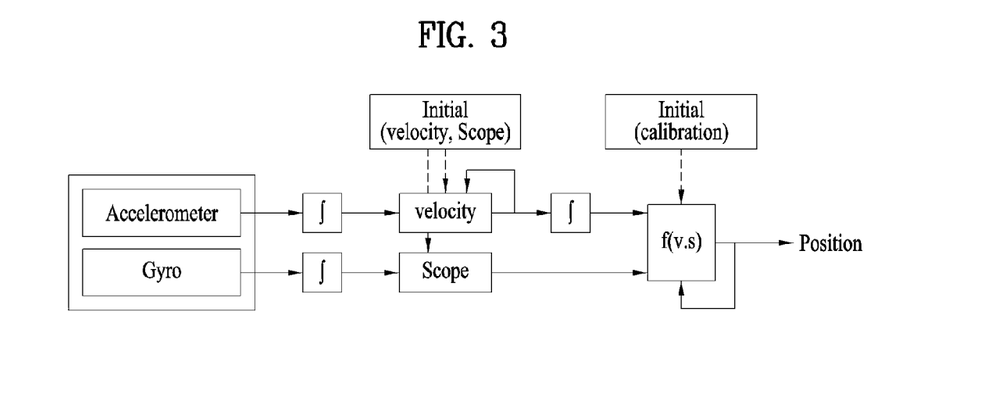
FIG. 3 is a diagram illustrating positioning through an accelerometer and a gyroscope.

FIG. 3 is a diagram illustrating positioning through an accelerometer and a gyroscope.

Referring to FIG. 3, an inertial sensor may include an accelerometer (acceleration sensor) and a gyroscope (angular velocity sensor). The positioning method shown in FIG. 3 calculates a relative location value through distance measurement using the accelerometer and movement direction measurement through the gyroscope. The positioning method using the inertial sensor performs positioning through an algorithm based on a value calculated by the accelerometer and a value calculated by a gyroscope.

Positioning through the inertial sensor is performed using the following method. A movement distance can be detected by integrating a result value measured through the accelerometer and a movement direction can be detected by integrating a result value measured through the gyroscope. The movement distance and movement direction can be detected through the inertial sensor in this manner, and thus positioning is possible since a moving point on coordinate can be detected. This inertial sensor based positioning may cause various errors because it calculates a relative value on the basis of a reference point. For example, inertial sensor based positioning may have errors such as an error with respect to accuracy of the reference point, an error of the inertial sensor (e.g. temperature or bias error) and errors with respect to movement (e.g. behavior pattern, movement pattern and rotation pattern).

While various technologies and methods are used for positioning, it is difficult to receive a global positioning system (GPS) signal in a building and thus the indoor location of a UE is estimated through a Wi-Fi positioning system (WPS) using a Wi-Fi signal in general. However, since the location is estimated based on Wi-Fi signal strength, it is difficult to estimate a correct location due to high sensitivity according to indoor environment, generating an error of about 3 to 5 m. To perform real-time positioning while making up for the weaknesses of WPS, the UE can calculate a location through a hybrid positioning system (HPS) using Wi-Fi signal strength and a built-in inertial sensor (e.g. accelerometer, gyroscope and magnetometer) of the UE. A sensor (e.g. inertial sensor) integrated into the UE may include the location information module 115.

To use the HPS, the UE can improve real-time tracking and positioning accuracy by using a sensor value measured through the inertial sensor for location calculation. Though positioning performance can be improved since Wi-Fi signal strength and the inertial sensor are simultaneously used, it is necessary to correct or compensate for the inertial sensor in order to acquire correct indoor location information when the HPS is used for indoor positioning because errors with respect to a temperature, bias, etc. and fluctuation increase with time in terms of the inertial sensor.

The present invention proposes a method for correcting or compensating for a sensor (e.g. an inertial sensor (inertial sensor will be described as the sensor)) used for positioning when the HPS is used as an indoor positioning method. In addition, a method for reducing errors with respect to an inertial sensor of a UE when the HPS is used for indoor positioning will now be described.

Embodiment 1

DB Based Compensation

A UE that performs positioning using the HPS measures the strength of a signal received from an AP and transmits a value (e.g. received signal strength indicator (RSSI)) indicating the received signal strength to the AP. Upon reception of the RSSI from the UE, the AP may transmit the RSSI to a higher location server or router. The higher location server or router may calculate the location of the UE using the received RSSI or the AP may calculate the location of the UE using the RSSI. The location server, router or AP may use the fingerprinting method described with reference to FIG. 2 or compare the received RSSI with a DB thereof to calculate the location of the UE.

For example, the location of the UE can be estimated through a fingerprinting algorithm such as $\min(\|\text{RSSI}_i \text{DB} - \text{RSSI}_i\|)$. Here, i denotes an AP index measured by the UE, $\text{RSSI}_i$ denotes received signal strength (RSS) measured from $AP_i$, and $\text{RSSI}_{DB}$ denotes RSS stored in a DB. In this manner, the HPS estimates the location of the UE through correlation with a higher DB. Furthermore, HPS using RSS of a Wi-Fi signal establishes a DB with respect to a weight factor and compensation factor for the inertial sensor and corrects the inertial sensor during positioning using the DB in order to reduce the fluctuation ratio and error rate of the inertial sensor and estimate the location of the UE.

The DB with respect to the inertial sensor may be composed of information on the inertial sensor, UE and inertial sensor feature (sensitivity, bias), etc. and includes the weighting factor, compensation factor, period, etc. HPS operation using the DB will be described hereinafter.

Figure 4:
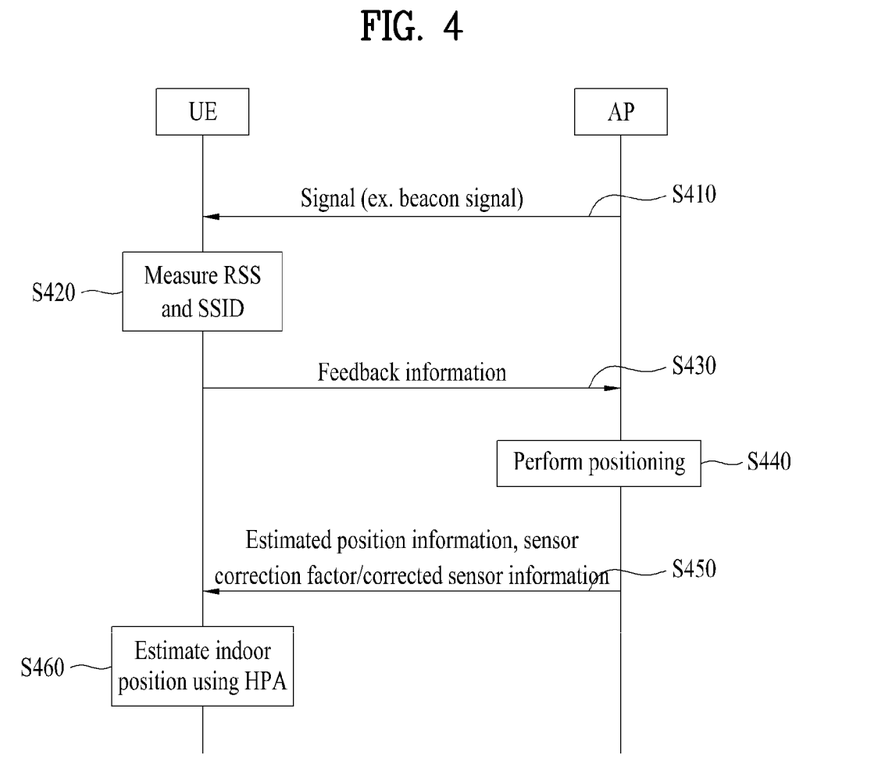
FIG. 4 is a diagram illustrating an indoor positioning method according to Embodiment 1 of the present invention.

FIG. 4 is a diagram illustrating an indoor positioning method according to Embodiment 1 of the present invention.

Referring to FIG. 4, the UE receives a signal (e.g. a beacon signal) from the AP (S410) and measures the received signal strength (RSS and SSID) from the received signal (S420). The UE transmits the measured information to the AP through feedback (S430). Here, the measurement information is transmitted in the following manner. The UE transmits measurement information and UE information (e.g. UE type and model) to the AP. Otherwise, the UE transmits information about a sensor (e.g. sensor type, sensor characteristics, etc.) along with the feedback information. The UE transmits the measurement information (e.g. RSSI and SSID), sensor information, UE information and sensor measurement information to the AP.

The AP performs positioning using the feedback information received from the UE (S440). The AP may calculate the location of the UE or transmit the received information to a higher location server or router such that the higher location server or router can calculate the location of the UE. In the present invention, the AP calculates the location of the UE. A location calculation operation of the AP can be performed by the higher location server or router in the same manner. Location calculation by the AP will now be described.

The AP estimates the location of the UE through fingerprinting using the RSSI and SSID measured and transmitted by the UE and a constructed Wi-Fi DB and corrects the inertial sensor of the UE according to information transmitted through feedback for the estimated location.

An inertial sensor DB stores UE types, UE class information, and correction factors or compensation factors corresponding to a movement distance of the UE, movement time, inertial sensor measurement time, etc. for each UE type or class. The AP sets a correction or compensation factor for the inertial sensor corresponding to the UE that transmits the signal in the inertial sensor DB on the basis of the UE information (e.g. UE type and UE class) transmitted from the UE.

Alternatively, when the UE transmits inertial sensor information along with the measurement information, the AP searches the inertial sensor DB for correction or compensation information about the corresponding sensor using the inertial sensor information transmitted from the UE and sets a correction or compensation factor with respect to the inertial sensor based on the searched information.

The AP transmits the inertial sensor correction or compensation information searched from the inertial sensor DB along with information on the estimated location to the UE (S450) or stores the information. Otherwise, the AP may transmit the information on the estimated location and a compensated value for the received inertial sensor information to the UE. Here, the inertial sensor correction factor set by the AP may be transmitted whenever information on an estimated location is transmitted. Alternatively, the AP may transmit the inertial sensor correction factor to the UE in an inertial sensor correction or compensation period. Alternatively, the AP may transmit the inertial sensor correction factor to the UE once in an initial location estimation stage.

The UE can receive the information on the estimated location and factors for inertial sensor correction (e.g. a resetting factor, a weighting factor and a period in which reliability of the inertial sensor is ensured or the inertial sensor needs to be reset)/corrected inertial sensor information from the AP and can then estimate an indoor location thereof through a hybrid positioning algorithm (HPA) using the received information (S460).

The method for estimating the indoor location of the UE will be described in detail hereinafter. The UE may correct or compensate for the inertial sensor using inertial sensor correction or compensation information received for an output value measured to estimate the location or reset the inertial sensor. If the inertial sensor performs measurement for a period longer than a period value included in the received inertial sensor correction factor, the UE resets the inertial sensor. If the inertial sensor performs measurement within a period corresponding to the period value, the UE can estimate the indoor location thereof using the sensor measurement result or weighting factor.

Alternatively, the UE can estimate the indoor location by applying Wi-Fi positioning information and sensor position information (SPI) received from the AP to the HPA (e.g. f(WPI, SPI)).

Embodiment 2

Machine Learning Based Compensation

The inertial sensor included in the UE continuously operates to measure movement of the UE rather than operating only when positioning is performed to carry out measurement. Accordingly, the UE can detect features of the inertial sensor included therein through a value measured by the inertial sensor. Therefore, the UE can set an adaptive measurement window size for the inertial sensor, a period of ensuring reliability of inertial sensor measurement values, an inertial sensor resetting period, a weighting factor for correcting/compensating for values measured by the inertial sensor, etc. by learning values measured by the inertial sensor prior to positioning.

As an embodiment, the UE stores inertial sensor signals with respect to movement thereof and performs the following operations through inertial sensor signals stored for a predetermined period.

1. Analysis of the magnitude and waveform of a signal measured by the inertial sensor A mean magnitude (M_mean) and variance ($\sigma$_magnitude) are obtained through inertial sensor signal magnitude analysis. A movement type (e.g. running, jogging or walking) can be determined through the magnitude and variance.

2. A duration/spacing of a peak lob and a side lob of an inertial sensor signal are measured to set a window size ensuring reliability of the inertial sensor signal.

3. The resetting period, an update period, etc. with respect to the inertial sensor are set using the results obtained through the above-mentioned process and a measured inertial sensor value and a weight factor for increasing stability of the inertial sensor can be set using the above-described values.

As described above, the UE can set an inertial sensor correction/compensation factor for increasing stability of the inertial sensor during positioning using inertial sensor measurement signals through learning prior to positioning. The inertial sensor correction/compensation factor may be set once prior to positioning and used or measured and updated at predetermined intervals. After the UE sets the inertial sensor correction/compensation factor through learning, the UE may store the set information or transmit the same to a higher node (e.g. AP, location server, gateway, router or the like) such that the higher node can use the information during positioning. Positioning can be performed in the following manners according to methods of using the inertial sensor correction/compensation factor.

When the UE has the Inertial Sensor Correction/Compensation Factor

The UE can perform movement measurement through the inertial sensor and measure RSSs from neighboring APs by receiving Wi-Fi signals transmitted from the APs during positioning. The UE transmits the measured RSSs to the APs and receives positioning information (calibration_AP) from the APs. In addition, the UE calculates positioning information (calibration_Sensor) about UE movement from a stable inertial sensor measurement value using a measured inertial sensor output and the set inertial sensor correction/compensation factor. The UE estimates the indoor location thereof by applying the positioning information (calibration_AP) received from the APs and the positioning information (calibration_Sensor) estimated through the inertial sensor to the HPS.

When a Node (e.g. AP, Location Server, Gateway or Router) has the Inertial Sensor Correction/Compensation Factor Transmitted from the UE The UE derives the inertial sensor correction/compensation factor using values obtained through inertial sensor measurement performed prior to or during positioning as described above. The UE transmits the UE ID, UE type/model, inertial sensor type, inertial sensor model and the derived inertial sensor correction/compensation factor to the AP. The AP constructs an inertial sensor DB using the information (inertial sensor correction/compensation factor, sensor information and UE information) received from the UE or transmits the information to a higher node such that the higher node constructs the inertial sensor DB. Here, the inertial sensor DB is constructed using values measured by the same inertial sensor or UEs. For example, adaptive inertial sensor correction/compensation factors are set using inertial sensor correction/compensation factors transmitted from UEs in a cell to construct the DB. In this manner, the inertial sensor correction/compensation factor DB is generated through measurement of the UE and the inertial sensor DB can be updated at specific intervals.

The UE that performs positioning transmits a signal including one or more of the measured Wi-Fi information (RSSI and STID), the inertial sensor correction/compensation factor, UE information and sensor information to the AP. The AP transmits the received information to a higher node, receives estimated location information and an adaptive inertial sensor correction/compensation factor from the higher node and delivers the same to the UE. Otherwise, the AP calculates the estimated location information and adaptive inertial sensor correction/compensation factor information and transmits the same to the UE.

Upon reception of the estimated location information and adaptive inertial sensor correction/compensation factor from the AP, the UE estimates information about UE movement by correcting/compensating the measured inertial sensor value using the received adaptive inertial sensor correction/compensation factor. The indoor location of the UE can be estimated using the information estimated by the UE and Wi-Fi estimated location information received from the AP.

The inertial sensor DB can be derived based on corresponding information received by the AP from UEs for a predetermined period only and provide corresponding information to the UE or updated with corresponding sensor information obtained through recognition of inertial sensor features using inertial sensor values measured by the UE and used during positioning. A sensor information update period may be signaled by the AP/BS or determined by the UE through analysis of sensor measurement values of the UE.

Embodiment 3

Position Tracking Output Based Compensation

The UE that performs positioning through HPS transmits an RSS and SSID detected through a signal received from the AP to the AP. Here, the UE performs measurement through the inertial sensor in order to use the HPS. The UE transmits information (e.g. acceleration, angular velocity, magnetic flux density, etc.) measured through the inertial sensor and information such as a sensor indicator, sensor type, etc. to the AP along with information detected through the Wi-Fi signal. Here, a period in which the UE receives a signal from the AP and feeds back a signal to the AP may not correspond to a sensor measurement period. For example, in a period in which the UE receives a signal from the AP and feeds back a signal to the AP, the inertial sensor may perform n measurements and have n measurement values. Accordingly, the UE can transmit a plurality of sensor measurement values during transmission of information with respect to a Wi-Fi signal received from the AP. Upon reception of the information with respect to the Wi-Fi signal and sensor measurement information from the UE, the AP operates in the following manner.

A case in which the AP directly performs positioning using the above-described information will now be described. The AP can detect inertial sensor features (e.g. a measurement window size, compensation factor, weighting factor, resetting period and reliable period) using an inertial sensor measurement value received from the UE. The AP can acquire calibration information via a sensor (CIBS) of the UE using inertial sensor information detected through the inertial sensor measurement value and a measured inertial sensor value. Upon acquisition of the CIBS, the AP calculates the location of the UE through a positioning algorithm F(CIBS, CIBWF) using the acquired CIBS and CIBWF obtained through fingerprinting.

The AP may transmit the received positioning related information to the location server, gateway or router corresponding to a higher node to perform positioning. Upon reception of the positioning related information, the location server, gateway or router can detect the inertial sensor features through the received inertial sensor measurement value, calculate the location of the UE using the detected features and Wi-Fi information and transmit the result to the AP in the same manner as the AP.

Alternatively, the UE may directly derive the position thereof through position calculation unlike Embodiments 1, 2 and 3. This will be described with reference to FIG. 5.

Figure 5:
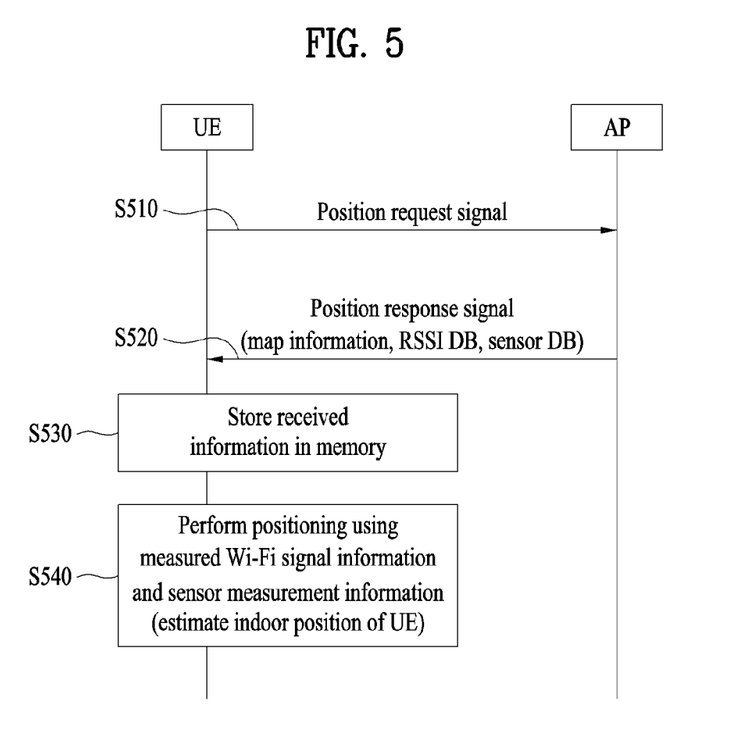
FIG. 5 is a diagram illustrating an indoor positioning method different from Embodiments 1, 2 and 3 of the present invention.

FIG. 5 is a diagram illustrating an indoor positioning method different from Embodiments 1, 2 and 3 of the present invention.

Referring to FIG. 5, the UE can directly estimate the location thereof. To achieve this, the UE transmits a position request signal to the AP for positioning (S510). Upon reception of the request signal, the AP transmits map information, RSSI DB information and inertial sensor DB information about an indoor environment in which the UE is located through a response signal to the UE (S520). Upon reception of the DB information and map information, the UE stores the information in a memory (S530). The UE calculates the position thereof using Wi-Fi information measured for positioning and sensor measurement information (S540). Here, a sensor factor from a DB transmitted from a higher layer may be used and an adaptive sensor factor may be derived through a measured value and used for positioning. Accordingly, the UE can acquire the indoor position thereof through location calculation using the DB received from the higher node and measured information.

As described above, the present invention proposes methods for improving reliability and stability of the inertial sensor included in the UE when the inertial sensor is used for hybrid positioning for estimating an accurate indoor position. According to the embodiments of the present invention, errors caused by the inertial sensor during hybrid positioning can be corrected or compensated and thus the correct indoor location of a UE can be estimated and calculated.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for calculating position of a user equipment (UE) located in an indoor, the method performed by the UE and comprising:
   transmitting, to an access point (AP), measurement information including an intensity of a signal received from the AP and feedback information including inertial sensor information of the UE;
   receiving, from the AP, an estimated position of the UE and compensation factor information for inertial sensor correction, the compensation factor information including a period of ensuring reliability of inertial sensor measurement values and a predetermined compensation value corresponding to the inertial sensor information of the UE;
   calculating a position of the UE using the inertial sensor during a specific time period;
   if the specific time period is shorter than the period of ensuring reliability of inertial sensor measurement values, calculating an indoor position of the UE using the estimated position of the UE and the predetermined compensation value and the position calculated by the inertial sensor; and
   if the specific time period is longer than the period of ensuring reliability of inertial sensor measurement values, resetting the inertial sensor.

2. The method according to claim 1, wherein the feedback information further includes at least one of an inertial sensor measurement value resetting factor, an inertial sensor measurement value weighting factor and an inertial sensor measurement period.

3. A user equipment (UE) for calculating a position of the UE located in an indoor, the UE comprising:
   a communications device; and
   a processor operatively connected to the communication device and configured to:
   transmit, to an access point (AP), measurement information including an intensity of a signal received from the AP and feedback information including inertial sensor information of the UE;
   receive, from the AP, an estimated position of the UE and compensation factor information for inertial sensor correction, the compensation factor information including a period of ensuring reliability of inertial sensor measurement values and a predetermined compensation value corresponding to the inertial sensor information of the UE;
   calculate a position of the UE using the inertial sensor during a specific time period;
   if the specific time period is shorter than the period of ensuring reliability of inertial sensor measurement values, calculate an indoor position of the UE using the estimated position of the UE and the predetermined compensation value and the position calculated by the inertial sensor; and
   if the specific time period is longer than the period of ensuring reliability of inertial sensor measurement values, resetting the inertial sensor.

4. The apparatus according to claim 3, wherein the feedback information further includes at least one of an inertial sensor measurement value resetting factor, an inertial sensor measurement value weighting factor and an inertial sensor measurement period.

* * * * *